United States Patent
Themelis et al.

(10) Patent No.: US 12,262,125 B2
(45) Date of Patent: Mar. 25, 2025

(54) SYSTEMS, METHODS AND COMPUTER PROGRAMS FOR A MICROSCOPE SYSTEM AND FOR DETERMINING A TRANSFORMATION FUNCTION

(71) Applicant: LEICA INSTRUMENTS (SINGAPORE) PTE. LTD., Singapore (SG)

(72) Inventors: George Themelis, Lindau (DE); Tobias Wilken, Binningen (CH)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 253 days.

(21) Appl. No.: 17/995,116

(22) PCT Filed: Mar. 8, 2021

(86) PCT No.: PCT/EP2021/055724
§ 371 (c)(1),
(2) Date: Sep. 30, 2022

(87) PCT Pub. No.: WO2021/197763
PCT Pub. Date: Oct. 7, 2021

(65) Prior Publication Data
US 2023/0217120 A1 Jul. 6, 2023

(30) Foreign Application Priority Data
Apr. 1, 2020 (EP) .................................... 20167604

(51) Int. Cl.
*H04N 23/85* (2023.01)
*G06T 7/90* (2017.01)
(Continued)

(52) U.S. Cl.
CPC ............... *H04N 23/85* (2023.01); *G06T 7/90* (2017.01); *H04N 5/265* (2013.01); *H04N 23/13* (2023.01);
(Continued)

(58) Field of Classification Search
CPC ........ H04N 23/85; H04N 5/265; H04N 23/13; H04N 23/45; G06T 7/90;
(Continued)

(56) References Cited

U.S. PATENT DOCUMENTS

2012/0061590 A1* 3/2012 Khojasteh ............ G02B 21/367
356/405
2012/0069171 A1 3/2012 Kodaira et al.

FOREIGN PATENT DOCUMENTS

| EP | 3205254 A1 | 8/2017 |
|----|------------|--------|
| JP | H10325798 A | 12/1998 |

(Continued)

*Primary Examiner* — Courtney D Thomas
(74) *Attorney, Agent, or Firm* — 2SPL Patent Attorneys PartG mbB; Kieran O'Leary

(57) ABSTRACT

Examples relate to systems, methods and computer programs for a microscope system and for determining a transformation function, and to a corresponding microscope system. The system for the microscope system comprises one or more processors and one or more storage devices. The system is configured to obtain first imaging sensor data from a first imaging sensor of a microscope of the microscope system and second imaging sensor data from a second imaging sensor of the microscope, the first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands (Continued)

that are used for fluorescence imaging. The system is configured to generate a composite color image based on the first imaging sensor data and based on the second imaging sensor data. The composite color image is based on a plurality of color channels. The composite color image is generated using a transformation function to define a transformation to be performed between the imaging sensor data and the composite color image, such that the composite color image is generated using sensor data on light sensed in each wavelength band of the first and second plurality of mutually separated wavelength bands.

16 Claims, 6 Drawing Sheets

(51) Int. Cl.
*H04N 5/265* (2006.01)
*H04N 23/13* (2023.01)
*H04N 23/45* (2023.01)

(52) U.S. Cl.
CPC ... *H04N 23/45* (2023.01); *G06T 2207/10024* (2013.01); *G06T 2207/10056* (2013.01); *G06T 2207/10064* (2013.01); *G06T 2207/20212* (2013.01); *G06T 2207/30004* (2013.01)

(58) Field of Classification Search
CPC . G06T 2207/10024; G06T 2207/10056; G06T 2207/10064; G06T 2207/20212; G06T 2207/30004; G06T 2207/20221; G06T 2207/30016; G06T 5/50
See application file for complete search history.

(56) References Cited

FOREIGN PATENT DOCUMENTS

| | | |
|---|---|---|
| JP | 2013098900 A | 11/2011 |
| JP | 2014103597 A | 6/2014 |
| WO | 2013109966 A1 | 7/2013 |

* cited by examiner

| # | $S_{A1}$ | $S_{B1}$ | $S_{C1}$ | $S_{A2}$ | $S_{B2}$ | $S_{C2}$ | R | G | B |
|---|---|---|---|---|---|---|---|---|---|
| 1 | | | | | | | | | |
| 2 | | | | | | | | | |
| 3 | | | | | | | | | |
| . | | | | | | | | | |
| . | | | | | | | | | |
| . | | | | | | | | | |
| 20 | | | | | | | | | |

SYSTEMS, METHODS AND COMPUTER PROGRAMS FOR A MICROSCOPE SYSTEM AND FOR DETERMINING A TRANSFORMATION FUNCTION

TECHNICAL FIELD

Examples relate to systems, methods and computer programs for a microscope system and for determining a transformation function, and to a corresponding microscope system.

BACKGROUND

Surgeon often use the color of tissue (e.g. of brain tissue) to distinguish suspicious tissue (e.g. lesions). However, in many cases, subtle tissue color differences are only seen by surgeons with long experience and trained visual acuity, which is difficult to learn. Multispectral reflectance imaging can capture very small or even invisible color differences by means of measuring very small spectral differences. However, for the known concepts of multispectral imaging, additional hardware may be necessary, in addition to the plurality of sensors of a modern microscope.

SUMMARY

There may be a desire for an improved concept for providing color images, in which subtle differences between different types of tissue are visible.

This desire is addressed by the subject-matter of the independent claims.

Embodiments of the present disclosure are based on the finding, that multi-spectral imaging can be performed by combining imaging sensor data from an imaging sensor that is primarily used to perform fluorescence imaging with imaging sensor data from an imaging sensor that is primarily used for reflectance imaging. Embodiments of the present disclosure thus provide a system for a microscope system. The system comprises one or more processors and one or more storage devices. The system is configured to obtain first imaging sensor data from a first imaging sensor of a microscope of the microscope system and second imaging sensor data from a second imaging sensor of the microscope. The first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The system is configured to generate a composite color image based on the first imaging sensor data and based on the second imaging sensor data. The composite color image is based on a plurality of color channels. The composite color image is generated using a transformation function to define a transformation to be performed between the imaging sensor data and the composite color image, such that the composite color image is generated using sensor data on light sensed in each wavelength band of the first and second plurality of mutually separated wavelength bands.

Embodiments of the present disclosure further provide a microscope system comprising the system and the microscope with the first and second imaging sensor. One of the first and the second imaging sensor is an imaging sensor that is adapted to provide a fluorescence imaging functionality of the microscope system.

Through the use of two sets of imaging sensor data, a more accurate transformation function can be used to construct the color image, which may thus show subtle differences between different types of tissue. At the same time, the re-use of the fluorescence imaging sensor for reflectance imaging may enable a use of the approach without having to include additional sensors in a microscope system.

In various embodiments, the transformation is based on a set of transformation factors that each define a transformation to be performed between the imaging sensor data on light sensed in a wavelength band and a color channel of the composite color image. For example, the set of transformation factors may provide a one-to-one transformation between an intensity of light measured in one of the wavelength bands and a color channel.

For example, the set of transformation factors may comprise one transformation factor for each combination of wavelength band and color channel. Thus, a one-to-one transformation may be applied, e.g. using a matrix multiplication. In other words, the set of transformation factors may provide a transformation between the imaging sensor data of each wavelength band of the first and second plurality of mutually separated wavelength bands and each of the color channels of the composite color image.

For example, the composite color image may comprise three color channels (e.g. Red, Green and Blue). Each of the color channels may be generated based on a transformation of the imaging sensor data of each wavelength band of the first and second plurality of mutually separated wavelength bands. The transformation may be performed using the transformation function. By using the imaging sensor data of each of the wavelength bands for each of the color channels, even subtle color differences may be included in the composite color image.

In various embodiments, the transformation function may be implemented by a transformation matrix. The system may be configured to transform the imaging sensor data of each wavelength band of the first and second plurality of mutually separated wavelength bands using the transformation matrix. Transformation matrices provide a computationally efficient implementation of the transformation function.

In various embodiments, the system is configured to provide a display signal to a display of the microscope system using an interface of the system, to cause the display to show the composite color image. Thus, the composite color image may be shown to a user of the microscope system, e.g. to a surgeon.

Embodiments of the present disclosure further provide a system for determining a transformation function. The system comprises one or more processors and one or more storage devices. The system is configured to obtain first imaging sensor data of a reference object from a first imaging sensor of a microscope and second imaging sensor data of the reference object from a second imaging sensor of the microscope. The first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The system is configured to obtain a composite reference image of the reference object.

The composite reference image comprises a plurality of color channels. The system is configured to determine the transformation function by determining a set of transformation factors that provide an approximate transformation between the imaging sensor data of each wavelength band of the first and second plurality of mutually separated wavelength bands and each of the color channels of the composite reference image. The transformation function is based on the set of transformation factors. Through the use of two sets of imaging sensor data, a more accurate transformation function can be used to construct the color image, which may thus show subtle differences between different types of tissue.

In some embodiments, the system is configured to identify a set of transformation factors that yields a lower mismatch between the composite reference image and a transformed image that is generated based on the set of transformation factors than at least one other set of transformation factors. In other words, the system may be configured to iteratively search for transformation factors that reduce a mismatch between the composite reference image and the transformed image.

For example, the composite reference image of the reference image may define a plurality of colors of a plurality of portions of the reference object. The plurality of colors may comprise a pre-defined first subset of colors and a second subset of colors. The system may be configured to identify a set of transformation factors that yields a lower mismatch between the composite reference image and a transformed image that is generated based on the set of transformation factors than at least one other set of transformation factors for the pre-defined first subset of colors. In other words, transformation factors may be identified that reduce the mismatch for the first subset of colors, which may be of particular interest. For example, the pre-defined first subset of colors may be colors that are present as colors of organic tissue in a surgical setting. An improved acuity in the colors of the first subset may be more beneficial than in other colors.

In various embodiments, the system is configured to identify a set of transformation factors that reduces a mismatch value representing the mismatch between the composite reference image compared to at least one other set of transformation factors. The mismatch value may be calculated for the colors of the plurality colors. A mismatch for a color of the pre-defined first subset of colors may have a higher impact on the mismatch value than a mismatch for a color of the second subset of colors. Thus, the colors of the first subset may receive a higher weight than other colors in the determination of the transformation factors.

Embodiments of the present disclosure further provide a method for a microscope system. The method comprises obtaining first imaging sensor data from a first imaging sensor of a microscope of the microscope system and second imaging sensor data from a second imaging sensor of the microscope. The first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The method comprises generating a composite color image based on the first imaging sensor data and based on the second imaging sensor data. The composite color image is based on a plurality of color channels. The composite color image is generated using a transformation function to define a transformation to be performed between the imaging sensor data and the composite color image, such that the composite color image is generated using sensor data on light sensed in each wavelength band of the first and second plurality of mutually separated wavelength bands.

Embodiments of the present disclosure further provide a method for determining a transformation function. The method comprises obtaining first imaging sensor data of a reference object from a first imaging sensor of a microscope and second imaging sensor data of the reference object from a second imaging sensor of the microscope. The first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The method comprises obtaining a composite reference image of the reference object. The composite reference image comprises a plurality of color channels. The method comprises determining the transformation function by determining a set of transformation factors that provide an approximate transformation between the imaging sensor data of each wavelength band of the first and second plurality of mutually separated wavelength bands and each of the color channels of the composite reference image. The transformation function is based on the set of transformation factors.

Embodiments of the present disclosure further provide a computer program with a program code for performing at least one of the methods when the computer program is run on a processor.

SHORT DESCRIPTION OF THE FIGURES

Some examples of apparatuses and/or methods will be described in the following by way of example only, and with reference to the accompanying figures, in which FIGS. 1a and 1b show schematic diagrams of a system for a microscope system, and of a microscope system comprising the system;

DETAILED DESCRIPTION

Various examples will now be described more fully with reference to the accompanying draw-ings in which some examples are illustrated. In the figures, the thicknesses of lines, layers and/or regions may be exaggerated for clarity.

Figure 1A:
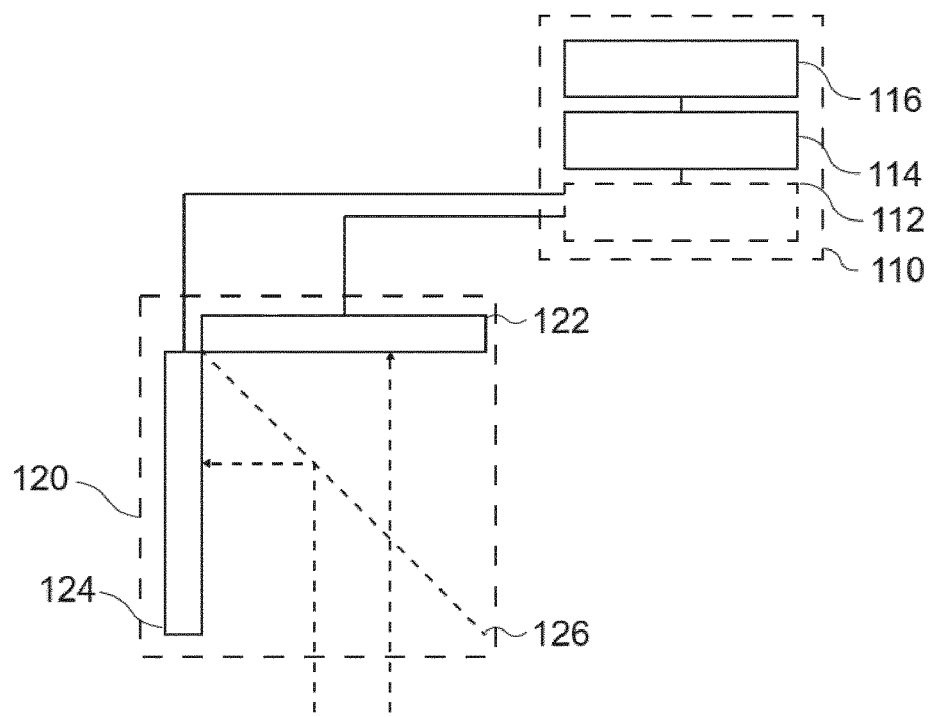
Figure 1B:
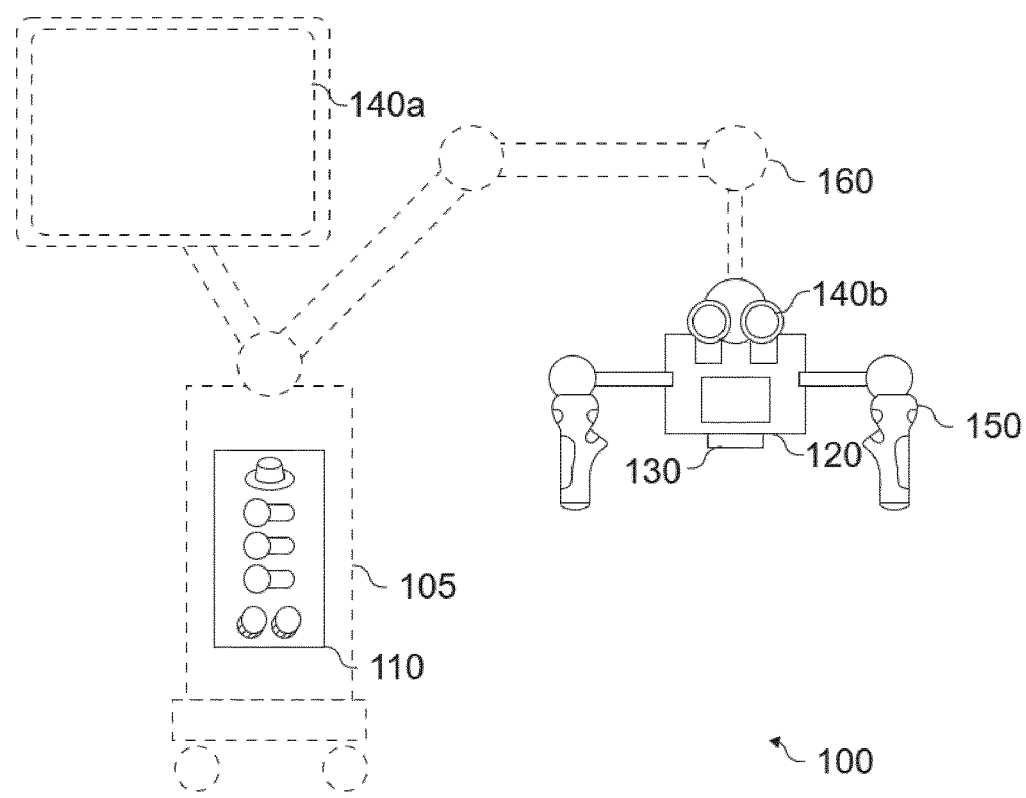

FIGS. 1a and 1b show schematic diagrams of a system 110 for a microscope system 100, and of a microscope system 100 comprising the system 110. The system 110 comprises one or more processors 114 and one or more storage devices 116. Optionally, the system further comprises an interface 112. The one or more processors are coupled to the interface and to the one or more storage devices. In general, the functionality of the system is provided by the one or more processors, e.g. in conjunction with the optional interface or with the one or more storage devices. For example, the system may be configured to obtain the imaging sensor data via the interface, and/or to store transformation factors of the transformation function using the one or more storage devices.

The system is configured to obtain first imaging sensor data from a first imaging sensor 122 of a microscope 120 of the microscope system and second imaging sensor data from a second imaging sensor 124 of the microscope. The first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The system is configured to generate a composite color image based on the first imaging sensor data and based on the second imaging sensor data. The composite color image is based on a plurality of color channels. The composite color image is generated using a transformation function to define a transformation to be performed between the imaging sensor data and the composite color image, such that the composite color image is generated using sensor data on light sensed in each wavelength band of the first and second plurality of mutually separated wavelength bands.

FIG. 1b shows a block diagram of a microscope system comprising the microscope 120 and the system 110. The microscope system shown in FIG. 1b is a surgical microscope system, which may be used at a surgical site by a surgeon. The surgical microscope system shown in FIG. 1b comprises a number of optional components, such as a base unit 105 (comprising the system 110) with a (rolling) stand, an auxiliary display 140a, a lighting system 130, a (robotic or manual) arm 160 which holds the microscope 120 in place, and which is coupled to the base unit 105 and to the microscope 120, and steering handles 150 that are attached to the microscope 120. In addition to the first and second imaging sensors 122; 124, the microscope 120 may comprise optional ocular displays 140b and an optional auxiliary display. In the context of this application, the term "(surgical) microscope system" is used, in order to cover the portions of the system that are not part of the actual microscope (which comprises optical components), but which are used in conjunction with the microscope, such as the display or the lighting system. One of the first and the second imaging sensor is an imaging sensor that is adapted to provide a fluorescence imaging functionality of the microscope system.

Various embodiments of the present disclosure relate to a system, method and computer program for a microscope system. In general, a microscope is an optical instrument that is suitable for examining objects that are too small to be examined by the human eye (alone). For example, a microscope may provide an optical magnification of an object. In modern microscopes, the optical magnification is often provided for a camera or an imaging sensor, such as the first and second imaging sensors 122; 124 of the microscope 120 of FIG. 1a. The microscope 120 may further comprise one or more optical magnification components that are used to magnify a view on the sample.

There are a variety of different types of microscopes. If the microscope system is used in the medical or biological fields, the object being viewed through the microscope may be a sample of organic tissue, e.g. arranged within a petri dish or present in a part of a body of a patient. For example, the microscope system 100 may be a microscope system for use in a laboratory, e.g. a microscope that may be used to examine the sample of organic tissue in a petri dish. Alternatively, the microscope 120 may be part of a surgical microscope system 100, e.g. a microscope to be used during a surgical procedure. Such a system is shown in FIG. 1b, for example. Although embodiments are described in connection with a microscope system, they may also be applied, in a more general manner, to any optical device.

The system is configured to obtain the first and second imaging sensor data from the first and second imaging sensors 122; 124 of the microscope. For example, the first and second imaging sensors 122; 124 may comprise or be an APS (Active Pixel Sensor)—or a CCD (Charge-Coupled-Device)-based imaging sensor. For example, in APS-based imaging sensors, light is recorded at each pixel using a photodetector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subse-quently moved between capacitive bins in the imaging sensor modules by a control circuitry of the sensor imaging module to perform the imaging. The first and second imaging sensor data may be obtained by receiving the respective imaging sensor data from the imaging sensor (e.g. via the interface 112), by reading the respective imaging sensor data out from a memory of the respective imaging sensor (e.g. via the interface 112), or by reading the respective imaging sensor data from a storage device 116 of the system 110, e.g. after the imaging sensor data has been written to the storage device 116 by the respective imaging sensor or by another system or processor.

The first imaging sensor data is obtained from the first imaging sensor, and the second imaging sensor data is obtained from the second imaging sensor. In other words, the first imaging sensor data and the second imaging sensor data are obtained from different sensors. Accordingly, the first imaging sensor is different from the second imaging sensor.

In various embodiments, as has been pointed out before, one of the imaging sensors may be a sensor that is typically used for fluorescence imaging. For example, when fluorescence imaging is not used, the respective imaging sensor may be used to provide additional sensor data, e.g. to improve the color accuracy of the composite color image. Embodiments may take advantage of the fact that a surgical microscope equipped for fluorescence microscopy has two imaging systems, one with known response bands (e.g. the first plurality of mutually separated wavelength bands) for generating a visual (reflectance image (this can be a conventional RGB camera) and also a fluorescence imaging system with specifically defined wavelength bands (e.g. around 560 nm, 630 nm, 800 nm for fluorescein, PPIX (Protoporphyrin IX), ICG (Indo-Cyanine Green) respectively, the second plurality of mutually separated wavelength bands). For example, the second imaging sensor may be adapted to provide a fluorescence imaging functionality of the microscope system. For example, in a first operating state of the microscope 120, the system may be configured to use the first optical imaging sensor for reflectance imaging and to use the second optical imaging sensor for fluorescence imaging, and in a second operating state of the microscope 120, system may be configured to use the first and the second imaging sensor to perform reflectance imaging, by generating the composite color image. In other words, the composite color image may be a reflectance image, i.e. might not be based on fluorescence imaging. Accordingly, the wavelength bands of the second plurality of mutually separated wavelength bands may be wavelength bands that are used for fluorescence imaging (i.e. emission wavelength bands used in fluorescent imaging). Accordingly, the wavelength bands of the first plurality of mutually separated wavelength bands may be wavelength bands that are used for reflectance imaging, e.g. across the visible color spectrum. In some embodiments, however, the first plurality of mutually separated wavelength bands may exclude the wavelength bands that are being used for fluorescence imaging. Accordingly, the wavelength bands of the first plurality and of the second plurality of mutually separated wavelength bands might not mutually overlap. In other words, a wavelength band might either be covered by the first or by the second plurality of mutually separated wavelength bands. In various embodiments, both the first and the second plurality of mutually separated wavelength bands comprise exactly three (contiguous) wavelength bands.

In general, the microscope system may comprise a lighting system (i.e. illumination system) that is configured to illuminate the sample being viewed through the microscope. In embodiments, the lighting system may be used to support the reflectance imaging and the fluorescence imaging being performed using the illumination system. To generate the composite color image, which is a reflectance image, the sample may be illuminated in each of the first and second plurality of mutually independent wavelength bands. Accordingly, the system may be configured to control the lighting system such, that the sample is illuminated in each of the first and second plurality of mutually independent wavelength bands (e.g. in the second operating state). If fluorescence imaging is performed (in addition to reflectance imaging), the system may be configured to control the lighting system such, that the sample is illuminated in each of the first plurality of mutually separated wavelength bands (and not in the wavelength bands of the second plurality of mutually separated wavelength bands), and (if not already contained in the first plurality of mutually separated wavelength bands), in one or more excitation wavelength bands of the fluorescent material being used for the sample. In the microscope system, light from the emission wavelength band may be (logically) removed from the illumination light and may also be directed solely to the fluorescence camera. When the system is not being used for microscopy, the additional information from reflectance imaging in the or each fluorescent emission band, including the NIR ICG (Near-InfraRed Indo-Cyanine Green) band, can be used to provide a more accurate reconstructed color image. Thus, the lighting system may be operated, by the system 110, to illuminate the site/sample in the emission wavelength band(s).

Figures 6, 7A:
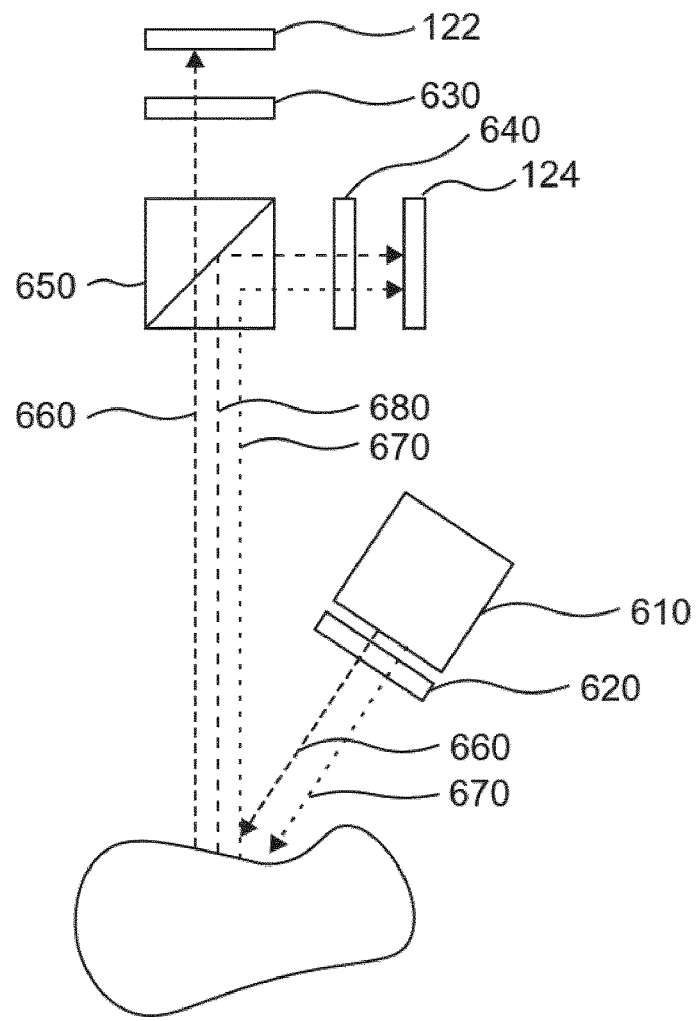
FIG. 6 shows a schematic diagram of a microscope and a lighting system.
FIG. 7a shows a schematic diagram of an exemplary color table.

In general, both the emission of the illumination by the lighting system, and the wavelength bands being sensed by the imaging sensors may be defined by a filter that is being mounted in a light path of the sensor or lighting system (see e.g. Filters 620-640 of FIG. 6). For example, a filter mounted in the light path of the first imaging sensor may be a bandpass filter that is adapted to filter out light in wavelength bands outside the first plurality of mutually separated wavelength bands, e.g. such that (only) light having a wavelength within the first plurality of mutually separated wavelength bands is admitted to the first imaging sensor Accordingly, a filter mounted in the light path of the second imaging sensor may be a bandpass filter that is adapted to filter out light in wavelength bands outside the second plurality of mutually separated wavelength bands, e.g. such that (only) light having a wavelength within the second plurality of mutually separated wavelength bands is admitted to the second imaging sensor. A filter mounted in a light path of the lighting system may be adapted to pass through light in all of the first and second plurality of mutually separated wavelength bands.

In various embodiments, as shown in FIGS. 1a and/or 1b, a beam splitter 126 is used to direct the light reflected or emitted by the sample to the first and second imaging sensor. For example, the beam splitter may be a polychroic mirror, that is configured to split the light such, that light at a given wavelength is either directed at the first imaging sensor or at the second imaging sensor. For example, the polychroic mirror may be adapted to direct light having a wavelength within the first plurality of mutually separated wavelength bands (only) to the first imaging sensor, and to direct light having a wavelength within the second plurality of mutually separated wavelength bands (only) to the second imaging sensor.

The system is configured to generate a composite color image based on the first and second imaging sensor data. In other words, the system is configured to generate a color image based on the imaging sensor data provided by two imaging sensors. Accordingly, the composite color image is a color image that is generated based on the imaging sensor provided by two different imaging sensors. For example, the composite color image may be a multi-spectral color image that is generated by using imaging sensor data from two imaging sensors, the imaging sensor data of each of the sensors representing light in a plurality of mutually separated wavelength bands. Consequently, the composite color image is a multi-spectral color image that is generated based on light sensed in a plurality of mutually separated wavelength bands, the plurality of mutually separated wavelength bands being sensed by two different imaging sensors (e.g. one that is used for reflectance imaging, and one that is used for reflectance and fluorescence imaging). For example, the composite color image may be generated based on the first and second imaging sensor data to improve a color accuracy of the composite color image.

The composite color image is generated using the transformation function. which defines the transformation to be performed between the imaging sensor data and the composite color image. In contrast to other approaches, the transformation function is configured such, that the composite color image is generated using sensor data on light sensed in each wavelength band of the first and second plurality of mutually separated wavelength bands. In other words, the light sensed in all of the mutually separated wavelength bands of the first and second plurality may be combined to generate the composite color image, e.g. to obtain a composite color image having an improved color accuracy. In general, the transformation function may be seen as set of instructions that are used to convert between the first and second imaging sensor data, on one side, and the composite color image on the other side.

In general, the first and second imaging sensor data may each comprise a plurality of pixels that are generated by a plurality of sensor pixels of the respective imaging sensor (e.g. after demosaicing). The respective imaging sensor data may comprise, for each pixel of the plurality of pixels, a plurality of numeric values representing the light sensed in the plurality of modulated wavelength bands, by wavelength bands. For example, if light is sensed in three mutually separated wavelength bands by the first and/or second imaging sensor, the first and/or second imaging sensor data may (each) comprise three numeric values per pixel representing the light sensed in the three mutually separated wavelength bands. The plurality of pixels of the first and second imaging sensor data may be in a pre-defined relationship. Ide-ally, the plurality of pixels of the two imaging sensors may be generated such, that each pixel of the first imaging sensor data represents the same point on the sample as a corresponding pixel of the second imaging sensor data.

For each pixel of the plurality of pixels, the system may be configured to input the numeric values of a pixel of the first imaging sensor data and the numeric values of the corresponding pixel of the second imaging sensor data into the transformation function, and calculate numerical values representing the pixel in the plurality of color channels of the composite color image. For example, if both the first and second plurality of mutually separated wavelength bands comprise three wavelength bands (for a total of six wavelength bands, and thus a total of six numerical values representing the light in the six wavelength bands), and if the composite color image is based on three color channels (e.g. Red, Green and Blue), the transformation function may specify a total of eighteen (six by three) transformations to be performed between the imaging sensor data and the channels of the composite color image. These transformations may be defined as a multiplicative factors that can be multiplied with the numerical values of the individual pixels of the first and second imaging sensor data. Accordingly, the transformation function may be based on a set of transformation factors that each define a transformation to be performed between the imaging sensor data on light sensed in a wavelength band (i.e. between one of a plurality of numerical values of a pixel) and a color channel of the composite color image (e.g. one of the three color channels). In the above example, the set of transformation factors may comprise eighteen transformation factors. In other words, the set of transformation factors may comprise one transformation factor for each combination of wavelength band (i.e. numerical value of a pixel representing light sensed in the wavelength band) and color channel (i.e. numerical value of the color channel for the pixel). For example, the set of transformation factors may provide a transformation between the imaging sensor data of each wavelength band of the first and second plurality of mutually separated wavelength bands and each of the color channels of the composite color image. The transformation function, and thus the set of transformation factors, may be applied (separately) to each pixel of the first and second imaging sensor data.

To improve performance, the transformation function may be defined as a matrix that can be multiplied with a vector comprising the first and second imaging sensor data. In other words, the transformation function may be implemented by a transformation matrix. The entries of the transformation matrix may be defined by the set of transformation factors). The system may be configured to transform the imaging sensor data of each wavelength band of the first and second plurality of mutually separated wavelength bands using the transformation matrix. For example, in FIG. 5d, an example of a transformation matrix is given.

As has been pointed out before, the composite color image may comprise three color channels, e.g. a red channel, a blue channel and a green channel (RGB). RGB is a channel model that is often used to represent color images, e.g. color images that are to be shown on a display. Each of the color channels of the composite color image may be generated based on a transformation of the imaging sensor data of each wavelength band of the first and second plurality of mutually separated wavelength bands. In other words, the numeric values of each of the first and second plurality of mutually separated wavelength bands may be used to calculate the numeric value of each of the color channels. The transformation may be performed using the transformation function, e.g. as shown above.

In various embodiments, the system is configured to provide a display signal to a display 140 of the microscope system using an interface 112 of the system 110, to cause the display to show the composite color image. In other words, the composite color image may be shown on a display of the microscope system, e.g. on an ocular display of the microscope system or on an auxiliary display of the microscope system.

The interface 112 may correspond to one or more inputs and/or outputs for receiving and/or transmitting information, which may be in digital (bit) values according to a specified code, within a module, between modules or between modules of different entities. For example, the interface 112 may comprise interface circuitry configured to receive and/or transmit information. In embodiments the one or more processors 114 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 116 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system and of the microscope system are mentioned in connection with the proposed concept or one or more examples described above or below (e.g. FIGS. 2 to 8). The system and of the microscope system may comprise one or more additional optional features corresponding to one or more aspects of the proposed concept or one or more examples described above or below.

Figure 2:
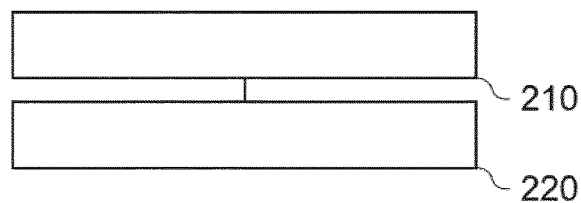
FIG. 2 shows a flow chart of a method for a microscope system.

FIG. 2 shows a flow chart of an embodiment of a corresponding method for a microscope system. The method comprises obtaining 210 first imaging sensor data from a first imaging sensor of a microscope of the microscope system and second imaging sensor data from a second imaging sensor of the microscope. The first imaging sensor data comprises sensor data on light sensed in a first plurality of mutually separated wavelength bands. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The method comprises generating 220 a composite color image based on the first imaging sensor data and based on the second imaging sensor data. The composite color image is based on a plurality of color channels. The composite color image is generated using a transformation function to define a transformation to be performed between the imaging sensor data and the composite color image, such that the composite color image is generated using sensor data on light sensed in each wavelength band of the first and second plurality of mutually separated wavelength bands.

As indicated above, features described in connection with the system 110 and the microscope system 100 of FIGS. 1a and/or 1b may be likewise applied to the method of FIG. 2.

More details and aspects of the method are mentioned in connection with the proposed concept or one or more examples described above or below (e.g. FIG. 1a to 1b, 3 to 8). The method may comprise one or more additional optional features corresponding to one or more aspects of the proposed concept or one or more examples described above or below.

Figure 3:
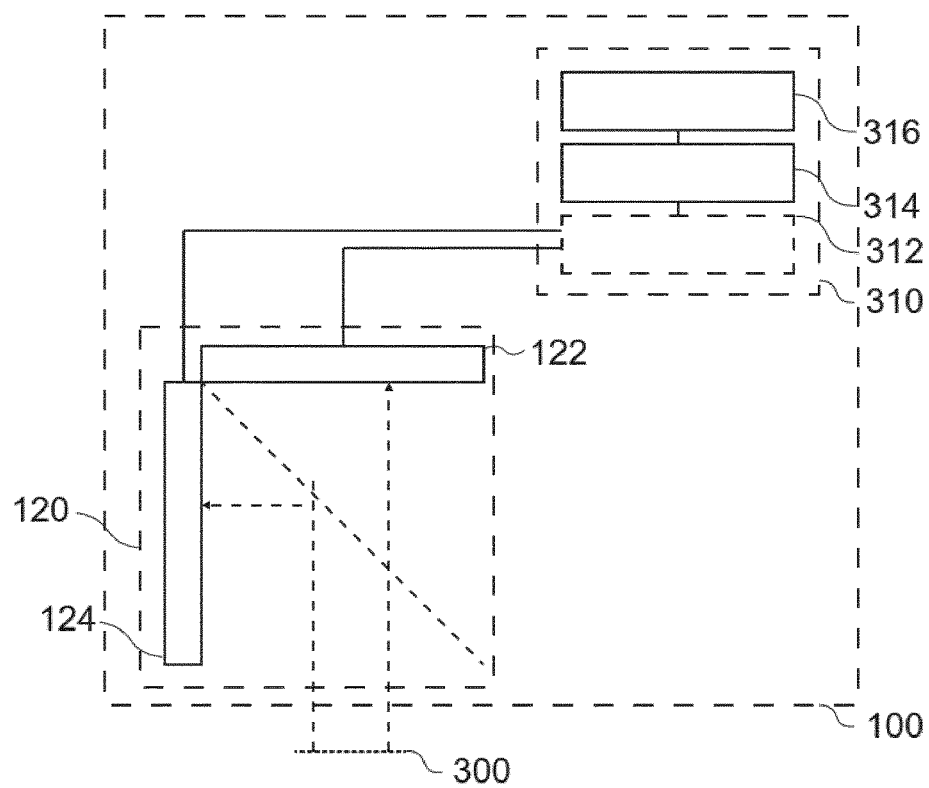
FIG. 3 shows a schematic diagram of a system for determining a transformation function.
Figure 4:
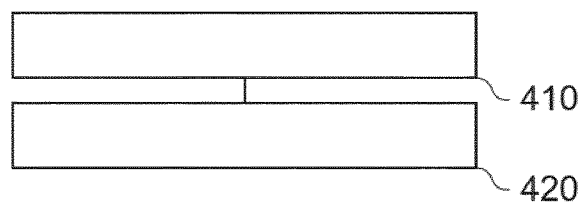
FIG. 4 shows a flow chart of a method for determining a transformation function.

While FIGS. 1a to 2 relate to the application of the transformation function in the generation of the composite color image, the following FIGS. 3 and 4 relate to the generation of the transformation function. Thus, the transformation function that is used in FIGS. 1a to 2 may be generated using the system, method and/or computer program presented in FIG. 3 or 4.

FIG. 3 shows a schematic diagram of a system for determining a transformation function. The system 310 comprises one or more processors 314 and one or more storage devices 316. Optionally, the system further comprises an interface 312. The one or more processors are coupled to the interface and to the one or more storage devices. In general, the functionality of the system is provided by the one or more processors, e.g. in conjunction with the optional interface or with the one or more storage devices. For example, the system may be configured to obtain the imaging sensor data via the interface, and/or to store transformation factors of the transformation function and/or the composite reference image using the one or more storage devices.

The system is configured to obtain first imaging sensor data of a reference object 300 from a first imaging sensor 122 of a microscope 120 and second imaging sensor data of the reference object from a second imaging sensor 124 of the microscope. The first imaging sensor data comprises sensor data on light sensed in a first plurality of mutually separated wavelength bands, the second imaging sensor data comprising sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The system is configured to obtain a composite reference image of the reference object. The composite reference image comprises a plurality of color channels. The system is configured to determine the transformation function by determining a set of transformation factors that provide an approximate transformation (i.e. a transformation that yields a mismatch between the generated composite color image and the composite reference images that is smaller than a mismatch being yielded using another set of transformation factors or that is smaller than a thresh-old) between the imaging sensor data of each wavelength band of the first and second plurality of mutually separated wavelength bands and each of the color channels of the composite reference image. The transformation function is based on the set of transformation factors.

For example, the system of FIG. 3 may be implemented similar to the system 110 of FIGS. 1a and/or 1b, e.g. by the same system. Accordingly, the system 110 and/or the system 310 may be configured to provide the functionality of the respective other system 310; 110. Accordingly, the microscope 120 may be the microscope 120 of the microscope system 100 of FIGS. 1a and/or 1b. Accordingly, the first and second imaging sensor data may also be implemented similar to the first and second imaging sensor data of FIGS. 1a and/or 1b. Furthermore, the transformation function may be implemented similar to the transformation function of FIGS. 1a to 2.

Some embodiments of the present disclosure relate to a system, a method and a computer program for determining a transformation function. As has been pointed out before in connection with FIGS. 1a to 2, a transformation function defines the transformation to be performed between the imaging sensor data and a composite color image that is based on the imaging sensor data. In general, the transformation function may be seen as set of instructions that are used to convert between the first and second imaging sensor data, on one side, and the composite color image on the other side. Embodiments shown in connection with FIGS. 3 and 4 provide an approach for generating such a transformation function, using a composite reference image and using the imaging sensor data provided by the two imaging sensors.

In general, the composite reference image may be implemented similar to the composite color image that is introduced in connection with FIGS. 1a and/or 1b—it is a color image, it is based on a plurality of color channels (e.g. three color channels—red, green and blue). The composite reference image may be different from the composite color image in that the numeric values representing the color channels of the individual pixels are reference values, i.e. values that define the numeric values that the transformation function that is being determined is to provide when applied to the first and second imaging sensor data showing the reference object. In other words—the first and second imaging sensor data show the reference object, and the reference composite image show the composite color image that is the desired result of the transformation function being applied to the first and second imaging sensor data. Preferably, the composite reference image comprises a plurality of pre-defined colors, with corresponding pre-defined numeric values representing the color channels of the individual pixels. For example, the reference object may be a color chart or color table, i.e. a table showing a plurality of colors each having a pre-defined representation in the plurality of channels of the composite reference image. Since the colors of the reference object are known from the composite reference image, the system can use the composite reference image as a desired result of the transformation function being applied on the imaging sensor data. Thus, the system may be configured to identify a set of transformation factors that defines a transformation to be performed between the imaging sensor data and a composite color image, such that a difference between the composite color image and the composite reference image is reduced. Contrary to other systems, the set of transformation factors is identified for the imaging sensor data of both imaging sensors, thus potentially yielding twice as many transformation factors, e.g. a first subset of transformation factors for providing a transformation between the first imaging sensor data and the composite color image and a second subset of transformation factors for providing a transformation between the first imaging sensor data and the composite color image, e.g. such that the difference between the composite color image and the composite reference image is reduced compared to other sets of transformation factors. In other words, the system may be configured to identify a set of transformation factors that yields a lower mismatch (i.e. difference) between the composite reference image and a transformed image (i.e. composite color image) that is generated based on the set of transformation factors than at least one other set of transformation factors. For example, the system may be configured to determine the set of transformation factors by defining a set of equations using the first and second imaging sensor data and the composite reference image, and solving the set of equations for a set of potential transformation factors that provide the transformation between the first and second imaging sensor data and the composite reference image. This may be performed for a plurality of different colors, e.g. for the plurality of colors of the reference object.

For example, the reference object may comprise a plurality of pre-defined colors (e.g. a color table), and the composite color image may comprise a plurality of portions representing the plurality of pre-defined colors. In other words, the composite reference image of the reference image may define a plurality of colors of a plurality of portions of the reference object, e.g. the plurality of pre-defined colors of the color table. The system may be configured to determine the set of transformation factors for the plurality of (pre-defined) colors, i.e. by identifying a set of transformation factors that provide, for each of the plurality of colors, an approximate transformation between the first and second imaging sensor data of a portion representing a (pre-defined color) and the pre-defined color, as represented by the plurality of channels of the composite reference image.

In applications like surgical microscopy, some colors may be more useful to the surgeon. For example, some colors may be indicative of pathologic tissue, but the difference between the color of pathologic tissue and the color of healthy tissue may be small. In some embodiments, those colors may be treated with priority in the determination of the set of transformation factors. For example, the plurality of (pre-defined) colors may comprise a pre-defined first subset of colors and a second subset of colors. For example, the pre-defined first subset of colors may be colors that are pre-defined as being important for a specific application of the microscope. The second subset of colors may be the other colors, i.e. the colors that are not important for that specific application of the microscope. For example, the pre-defined first subset of colors may be colors that are present as colors of organic tissue in a surgical setting, e.g. colors that are indicative of healthy or pathologic tissue. The colors of the second subset of colors may be colors that are less relevant in identifying healthy or pathologic tissue. Accordingly, he system may be configured to identify a set of transformation factors that yields a lower mismatch between the composite reference image and a transformed image that is generated based on the set of transformation factors than at least one other set of transformation factors for the pre-defined first subset of colors. In some embodiments, the second subset of colors might not be considered in the identification of the set of transformation factors. In some other embodiments, however, the second subset of colors might be considered, albeit with a lower priority or weighting than the pre-defined first subset of colors. In other words, the system may be configured to identify a set of transformation factors that reduces a mismatch value representing the mismatch between the composite reference image compared to at least one other set of transformation factors. The mismatch value may be calculated for the colors of the plurality colors. A mismatch for a color of the pre-defined first subset of colors may have a higher impact on the mismatch value than a mismatch for a color of the second subset of colors. In other words, a mismatch for a color of the pre-defined first subset of colors may receive a higher weighting than a mismatch for a color of the pre-defined second subset in the identification of the set of transformation factors.

Embodiments of the present disclosure further provide a microscope system 100 (which may be implemented similar to the microscope system of FIGS. 1a and/or 1b) comprising the system 310 (and optionally the system 110, if the systems are implemented separately) and the microscope 120 with the first 122 and second 124 imaging sensor. One of the first and the second imaging sensor may be an imaging sensor that is adapted to provide a fluorescence imaging functionality of the microscope system.

The interface 312 may correspond to one or more inputs and/or outputs for receiving and/or transmitting information, which may be in digital (bit) values according to a specified code, within a module, between modules or between modules of different entities. For example, the interface 312 may comprise interface circuitry configured to receive and/or transmit information. In embodiments the one or more processors 314 may be implemented using one or more processing units, one or more processing devices, any means for processing, such as a processor, a computer or a programmable hardware component being operable with accordingly adapted software. In other words, the described function of the one or more processors 314 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 316 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system and of the microscope system are mentioned in connection with the proposed concept or one or more examples described above or below (e.g. FIG. 1a to 2, 4 to 8). The system and of the microscope system may comprise one or more additional optional features corresponding to one or more aspects of the proposed concept or one or more examples described above or below.

FIG. 4 shows a flow chart of an embodiment of a method for determining a transformation function. The method comprises obtaining 410 first imaging sensor data of a reference object from a first imaging sensor of a microscope and second imaging sensor data of the reference object from a second imaging sensor of the microscope. The first imaging sensor data comprises sensor data on light sensed in a first plurality of mutually separated wavelength band. The second imaging sensor data comprises sensor data on light sensed in a second plurality of mutually separated wavelength bands. The wavelength bands of the first plurality of mutually separated wavelength bands or of the second plurality of mutually separated wavelength bands are wavelength bands that are used for fluorescence imaging. The method comprises obtaining 420 a composite reference image of the reference object, the composite reference image comprising a plurality of color channels. The method comprises determining 430 the transformation function by determining a set of transformation factors that provide an approximate transformation between the imaging sensor data of each wavelength band of the first and second plurality of mutually separated wavelength bands and each of the color channels of the composite reference image. The transformation function is based on the set of transformation factors.

As indicated above, features described in connection with the system 310 of FIG. 3 may be likewise applied to the method of FIG. 4.

More details and aspects of the method are mentioned in connection with the proposed concept or one or more examples described above or below (e.g. FIG. 1a to 3, 5a to 8). The method may comprise one or more additional optional features corresponding to one or more aspects of the proposed concept or one or more examples described above or below.

Various embodiments of the present disclosure are based on using the fluorescence camera of a microscope system for multispectral reflectance imaging.

As has been pointed out before, surgeons often use the tissue (brain) color in order to distinguish tissue that is suspicious with regards to lesions. However, subtle tissue color differences might only be seen by surgeons with long experience and trained visual acuity, which is difficult to learn.

Multispectral reflectance imaging can capture very small or even invisible color differences by means of measuring very small spectral differences. However, for conventional multispectral imaging, additional hardware may be be necessary, in addition to the plurality of sensors of a modern microscope, which is typically equipped with 3D and fluorescence cameras.

Embodiments of the present disclosure may use the existing fluorescence sensor of a surgical microscope system for multispectral reflectance imaging when fluorescence mode is not active. This may enable the use of the function without additional cost, size, and complexity, by means of software.

Various embodiments may use multispectral imaging to produce accurate color tissue imaging. This can be done by measuring more than three spectral bands, e.g. six spectral bands (e.g. three spectral bands each from the first and second imaging sensor data), and then digitally recombine the spectral information to calculate the RGB values (i.e. the combined color image). Thereby, the color capturing may be more accurate.

For imaging systems which use multiple sensors for reflectance and fluorescence imaging, multispectral reflectance imaging can be done by using the fluorescence bands in reflectance mode. This may be enabled by providing illumination in the fluorescence bands Subtle color differences, with diagnostic importance, may be digitally enhanced so be easily seen even by untrained surgeons.

Figure 5A:
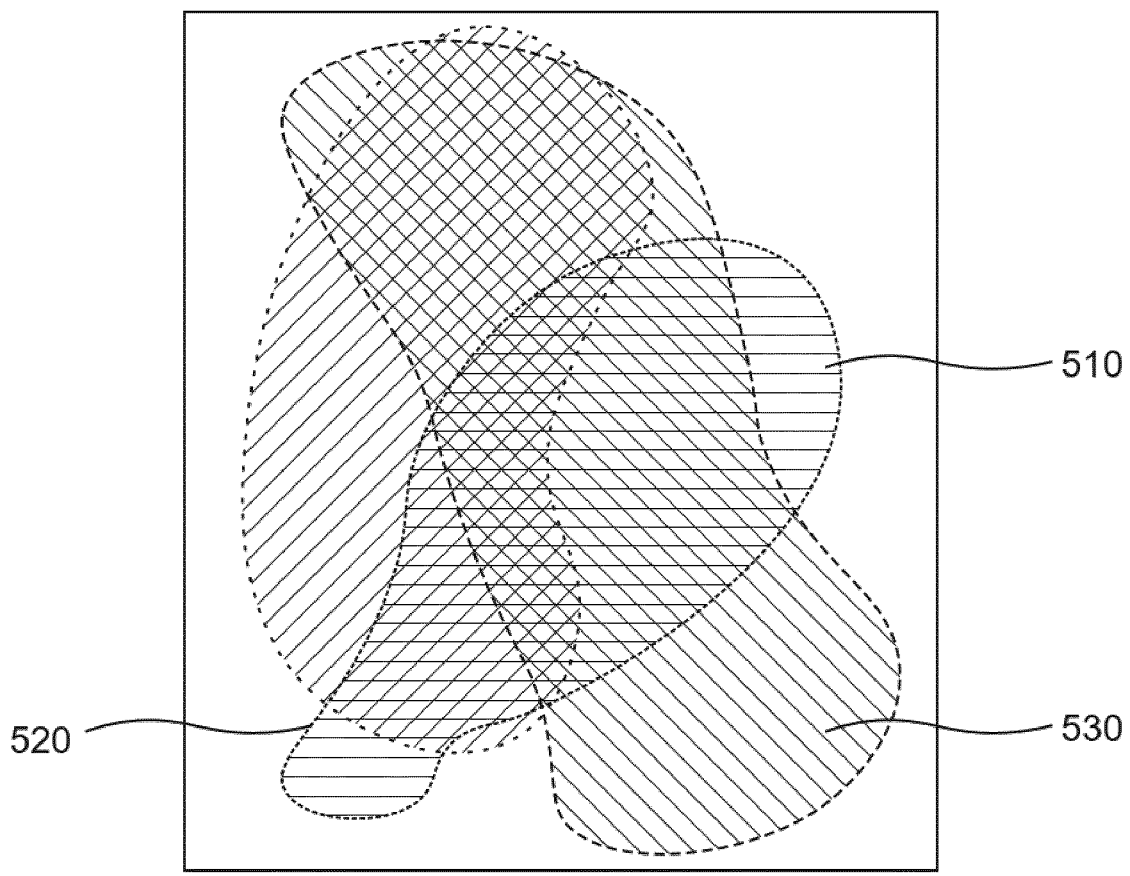
FIG. 5a shows a schematic diagram of different colors present in an image frame.

FIG. 5a shows a schematic diagram of different colors present in an image frame. In FIG. 5a, three regions 510-530 of organic tissue (e.g. brain tissue are shown), with each region having a specific color, with region 510 having a blueish color, region 520 having a greenish color, and region 530 having a reddish color.

Figure 5B:
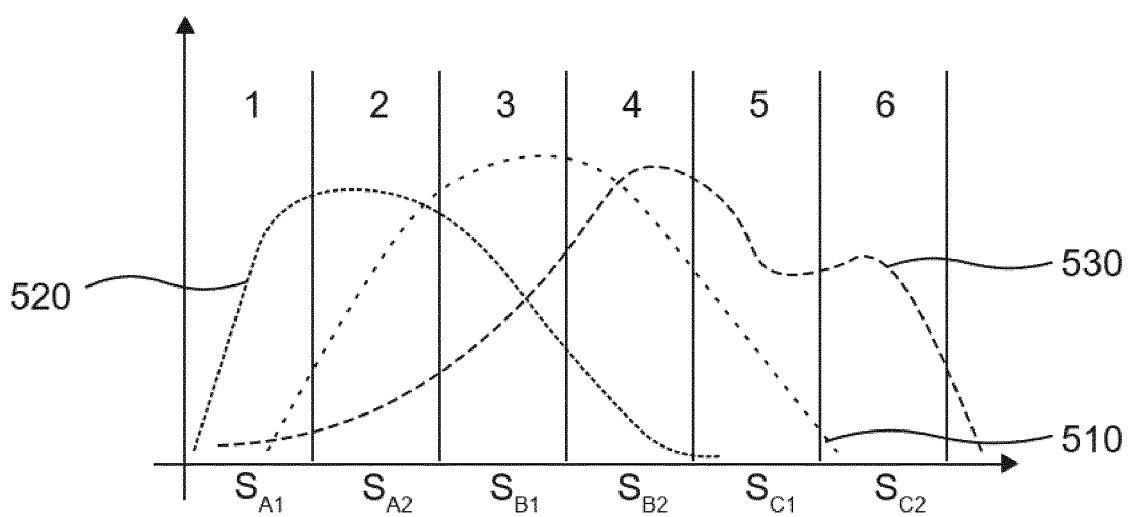
FIGS. 5b and 5c show schematic diagrams of an intensity of different colors, as sensed in different frequency bands.
Figures 5C, 5D:
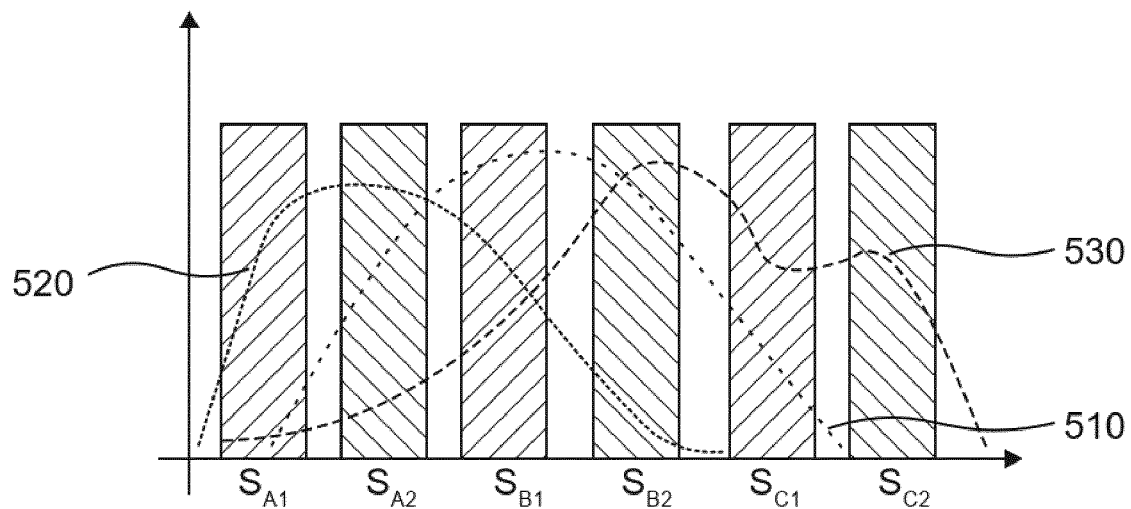
FIG. 5d shows an exemplary transformation matrix.

FIGS. 5b and 5c show schematic diagrams of an intensity of the different colors of the different regions 510-530, as sensed in different frequency bands 1-6, which are sensed by two sensors (1 and 2 of the indices), each sensor sensing light in three wavelength bands (A-C), thereby generating imaging sensor data $S_{A1}$, $S_{A2}$, $S_{B1}$, $S_{B2}$, $S_{C1}$ and $S_{C2}$. As can be seen in FIG. 5c, the sensors may sense the light in frequency bands that are narrower than is shown in FIG. 5b, making the frequency bands mutually separated frequency bands. The different sensors are highlighted with different background patterns.

The sensor data that is generated in the mutually separated frequency bands may be used to generate an RGB image, e.g. via a transformation matrix comprising a set of transformation factors. FIG. 5d shows an exemplary transformation matrix, of size 3-by-6, comprising 18 transformation factors $F_{11}$-$F_{36}$ (the indices showing the row and column). This transformation matrix is multiplied with a (6-by-1) matrix comprising the sensor data $S_{A1}$, $S_{A2}$, $S_{B1}$, $S_{B2}$, $S_{C1}$ and $S_{C2}$ to obtain the RGB values of the composite color image (as 3-by-1 matrix).

FIG. 6 shows a schematic diagram of a microscope and a lighting system. As has been pointed out before, sensor data of two imaging sensors are used, of a first imaging sensor (e.g. a CCD sensor) 122 that is used for reflectance imaging, and of a second imaging sensor (e.g. a CCD sensor) 124 that is primarily used for fluorescence imaging. The first imaging sensor may be configured to provide a color reflectance image, and the second imaging sensor is provided a fluorescence image (in a first operation mode) and a reflectance image (e.g. in three bands, in a second operation mode). Both imaging sensors are combined with mirrors 630; 640 which may filter light that is outside the frequency bands to be sensed by the respective imaging sensor. A polychroic mirror 650 is used to divide the light in the different wavelength bands and to direct the respective wavelength bands to the sensors. A lighting system 610 is used (in combination with a filter 620 to filter the light emitted by the lighting system) to illuminate the object that is imaged by the imaging sensors. FIG. 6 further shows the light in the different wavelength bands (in different line styles), with visible light 660 being admitted to the first imaging sensor, and light in emission wavelength bands being admitted to the second imaging sensor, the light in the emission wavelength bands either being emitted 670 by the lighting system, or by a fluorescent material 680 of the object that is excited in a fluorescence excitation wavelength band (e.g. by the visible light 660).

Figures 7B, 8:
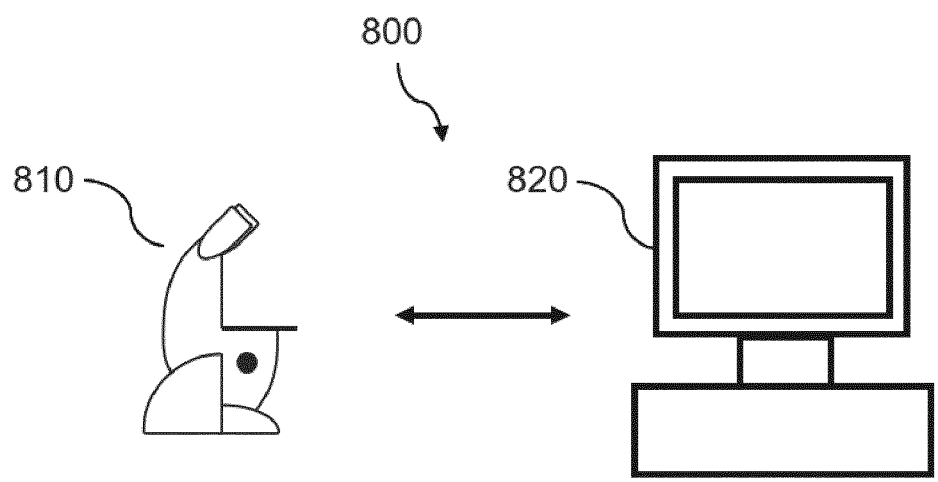
FIG. 7b shows a diagram of an exemplary system of equations.
FIG. 8 shows a schematic diagram of a microscope system comprising a microscope and a computer system.

In FIGS. 7a and 7b, a concept for generating the transformation function is illustrated. As has been introduced in connection with FIGS. 3 and 4, the transformation function may be determined by using a reference color table with "known" RGB values of the color samples of the color table. FIG. 7a shows a schematic diagram of an exemplary color table, comprising color fields 1 to 20. The color table may be recorded by the two imaging sensors, and the corresponding sensor data may be determined for the individual mutually separated wavelength bands. The known RGB values and the sensor data of the individual wavelength bands may be input into an equation system, and the equation system may be solved, such that a difference between the obtained colors and the known RGB values is reduce or minimized for the different color samples. FIG. 7b shows a diagram of an exemplary system of equations, with columns for the number of the sample, columns for the sensor data of the different wavelength bands, and columns for the known RGB values.

More details and aspects of the concept are mentioned in connection with the proposed concept or one or more examples described above or below (e.g. FIG. 1a to 4, 8). The concept may comprise one or more additional optional features corresponding to one or more aspects of the proposed concept or one or more examples described above or below.

Some embodiments relate to a microscope comprising a system as described in connection with one or more of the FIGS. 1 to 7b. Alternatively, a microscope may be part of or connected to a system as described in connection with one or more of the FIGS. 1 to 7b. FIG. 8 shows a schematic diagram of a microscope system comprising a microscope and a computer system. FIG. 8 shows a schematic illustration of a system 800 configured to perform a method described herein. The system 800 comprises a microscope 810 and a computer system 820. The microscope 810 is configured to take images and is connected to the computer system 820. The computer system 820 is configured to execute at least a part of a method described herein. The computer system 820 may be configured to execute a machine learning algorithm. The computer system 820 and microscope 810 may be separate entities but can also be integrated together in one common housing. The computer system 820 may be part of a central processing system of the microscope 810 and/or the computer system 820 may be part of a sub-component of the microscope 810, such as a sensor, an actor, a camera or an illumination unit, etc. of the microscope 810.

The computer system 820 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 820 may comprise any circuit or combination of circuits. In one embodiment, the computer system 820 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 820 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 820 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 820 may also include a display device, one or more speakers, and a keyboard and/or controller, which can include a mouse, trackball, touch screen, voice-recognition device, or any other device that permits a system user to input information into and receive information from the computer system 820.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

- 100 Microscope system
- 105 Base unit
- 110 System
- 112 Interface
- 114 One or more processors
- 116 One or more storage devices
- 120 Microscope
- 122 First imaging sensor
- 124 Second imaging sensor
- 126 Beam splitter/polychroic mirror
- 130 Lighting system
- 140a/b Displays
- 150 Steering handles
- 160 Arm
- 210 Obtaining first and second imaging sensor data
- 220 Generating a composite color image
- 300 Reference object
- 310 System
- 312 Interface
- 314 One or more processors
- 316 One or more storage devices
- 410 Obtaining first and second imaging sensor data
- 420 Obtaining a composite reference image
- 430 Determining a transformation function
- 510-530 Regions having different colors
- 610 Lighting system
- 620-640 Filters
- 650 Polychroic mirror
- 660 Visible light
- 670 Light emitted by the lighting system and reflected by object
- 680 Light emitted by the object
- 800 System
- 810 Microscope
- 820 Computer System

The invention claimed is:

1. A system for a microscope system, the system comprising one or more processors and one or more storage devices, wherein the system is configured to:

obtain first imaging sensor data from a first imaging sensor of a microscope of the microscope system and second imaging sensor data from a second imaging sensor of the microscope, the first imaging sensor data comprising sensor data on light sensed in a first plurality of mutually separated wavelength bands, the second imaging sensor data comprising sensor data on light sensed in a second plurality of mutually separated wavelength bands, wherein the wavelength bands of the first plurality of mutually separated wavelength bands or of the second plurality of mutually separated wavelength bands are wavelength bands that are used for fluorescence imaging, wherein the system is configured to use the first and the second imaging sensor to perform reflectance imaging; and generate a composite color image based on the first imaging sensor data and based on the second imaging sensor data, the composite color image being based on a plurality of color channels, wherein the composite color image is generated using a transformation function to define a transformation to be performed between the imaging sensor data and the composite color image, such that the composite color image is generated using sensor data on light sensed in each wavelength band of the first and second plurality of mutually separated wavelength bands.

2. The system according to claim 1, wherein the transformation is based on a set of transformation factors that each define a transformation to be performed between the imaging sensor data on light sensed in a wavelength band and a color channel of the composite color image.

3. The system according to claim 2, wherein the set of transformation factors comprises one transformation factor for each combination of wavelength band and color channel, and/or wherein the set of transformation factors provide a transformation between the imaging sensor data of each wavelength band of the first and second plurality of mutually separated wavelength bands and each of the color channels of the composite color image.

4. The system according to claim 1, wherein the composite color image comprises three color channels, wherein each of the color channels is generated based on a transformation of the imaging sensor data of each wavelength band of the first and second plurality of mutually separated wavelength bands, the transformation being performed using the transformation function.

5. The system according to claim 1, wherein the transformation function is implemented by a transformation matrix, wherein the system is configured to transform the imaging sensor data of each wavelength band of the first and second plurality of mutually separated wavelength bands using the transformation matrix.

6. The system according to claim 1, wherein the system is configured to provide a display signal to a display of the microscope system using an interface of the system, to cause the display to show the composite color image.

7. A microscope system comprising the system according to claim 1 and the microscope with the first and second imaging sensor, wherein one of the first and the second imaging sensor is an imaging sensor that is adapted to provide a fluorescence imaging functionality of the microscope system.

8. A system for determining a transformation function, the system comprising one or more processors and one or more storage devices, wherein the system is configured to:

obtain first imaging sensor data of a reference object from a first imaging sensor of a microscope and second imaging sensor data of the reference object from a second imaging sensor of the microscope, the first imaging sensor data comprising sensor data on light sensed in a first plurality of mutually separated wavelength bands, the second imaging sensor data comprising sensor data on light sensed in a second plurality of mutually separated wavelength bands, wherein the wavelength bands of the first plurality of mutually separated wavelength bands or of the second plurality of mutually separated wavelength bands are wavelength bands that are used for fluorescence imaging;

obtain a composite reference image of the reference object, the composite reference image being a reflectance image comprising a plurality of color channels; and determine the transformation function by determining a set of transformation factors that provide an approximate transformation between the imaging sensor data of each wavelength band of the first and second plurality of mutually separated wavelength bands and each of the color channels of the composite reference image, wherein the transformation factors provide a one-to-one transformation between an intensity of light measured in one of the wavelength bands of the first and second plurality of mutually separated wavelength bands and a respective color channel of the color channels of the composite reference image, and wherein the transformation function is based on the set of transformation factors.

9. The system according to claim 8, wherein the system is configured to identify a set of transformation factors that yields a lower mismatch between the composite reference image and a transformed image that is generated based on the set of transformation factors than at least one other set of transformation factors.

10. The system according to claim 9, wherein the composite reference image of the reference image defines a plurality of colors of a plurality of portions of the reference object, the plurality of colors comprising a pre-defined first subset of colors and a second subset of colors, wherein the system is configured to identify a set of transformation factors that yields a lower mismatch between the composite reference image and a transformed image that is generated based on the set of transformation factors than at least one other set of transformation factors for the pre-defined first subset of colors.

11. The system according to claim 10, wherein the pre-defined first subset of colors are colors that are present as colors of organic tissue in a surgical setting.

12. The system according to claim 10, wherein the system is configured to identify a set of transformation factors that reduces a mismatch value representing the mismatch between the composite reference image compared to at least one other set of transformation factors, wherein the mismatch value is calculated for the colors of the plurality colors, wherein a mismatch for a color of the pre-defined first subset of colors has a higher impact on the mismatch value than a mismatch for a color of the second subset of colors.

13. A method for a microscope system, the method comprising:

obtaining first imaging sensor data from a first imaging sensor of a microscope of the microscope system and second imaging sensor data from a second imaging sensor of the microscope, the first imaging sensor data comprising sensor data on light sensed in a first plurality of mutually separated wavelength bands, the second imaging sensor data comprising sensor data on light sensed in a second plurality of mutually separated wavelength bands, wherein the wavelength bands of the first plurality of mutually separated wavelength bands or of the second plurality of mutually separated wavelength bands are wavelength bands that are used for fluorescence imaging, wherein the system is configured to use the first and the second imaging sensor to perform reflectance imaging; and generating a composite color image based on the first imaging sensor data and based on the second imaging sensor data, the composite color image being based on a plurality of color channels, wherein the composite color image is generated using a transformation function to define a transformation to be performed between the imaging sensor data and the composite color image, such that the composite color image is generated using sensor data on light sensed in each wavelength band of the first and second plurality of mutually separated wavelength bands.

14. A non-transitory, computer-readable medium comprising a program code that, when the program code is executed on a processor, a computer, or a programmable hardware component, causes the processor, computer, or programmable hardware component to perform the method of claim 13.

15. A method for determining a transformation function, the method comprising:

obtaining first imaging sensor data of a reference object from a first imaging sensor of a microscope and second imaging sensor data of the reference object from a second imaging sensor of the microscope, the first imaging sensor data comprising sensor data on light sensed in a first plurality of mutually separated wavelength bands, the second imaging sensor data comprising sensor data on light sensed in a second plurality of mutually separated wavelength bands, wherein the wavelength bands of the first plurality of mutually separated wavelength bands or of the second plurality of mutually separated wavelength bands are wavelength bands that are used for fluorescence imaging;

obtaining a composite reference image of the reference object, the composite reference image being a reflectance image comprising a plurality of color channels; and determining the transformation function by determining a set of transformation factors that provide an approximate transformation between the imaging sensor data of each wavelength band of the first and second plurality of mutually separated wavelength bands and each of the color channels of the composite reference image, wherein the transformation factors provide a one-to-one transformation between an intensity of light measured in one of the wavelength bands of the first and second plurality of mutually separated wavelength bands and a respective color channel of the color channels of the composite reference image, and wherein the transformation function is based on the set of transformation factors.

16. A non-transitory, computer-readable medium comprising a program code that, when the program code is executed on a processor, a computer, or a programmable hardware component, causes the processor, computer, or programmable hardware component to perform the method of claim 15.

* * * * *